United States Patent
Lee et al.

(10) Patent No.: US 11,085,849 B2
(45) Date of Patent: Aug. 10, 2021

(54) OPTICAL TEST SYSTEM AND METHOD FOR DETERMINING SIZE OF GAP BETWEEN TWO SUBSTRATES OF OPTICAL ELEMENT

(71) Applicant: Taiwan Semiconductor Manufacturing Co., Ltd., Hsinchu (TW)

(72) Inventors: Clark Lee, Taipei (TW); Yi-Chuan Lo, Hsinchu (TW); Hsun-Peng Lin, Nanzhuang Township, Miaoli County (TW); Chih-Ming Hong, Hsinchu (TW)

(73) Assignee: TAIWAN SEMICONDUCTOR MANUFACTURING CO., LTD, Hsinchu (TW)

( * ) Notice: Subject to any disclaimer, the term of this patent is extended or adjusted under 35 U.S.C. 154(b) by 0 days.

(21) Appl. No.: 16/715,855

(22) Filed: Dec. 16, 2019

(65) Prior Publication Data
US 2020/0116588 A1    Apr. 16, 2020

Related U.S. Application Data

(63) Continuation of application No. 16/021,426, filed on Jun. 28, 2018, now Pat. No. 10,508,971.

(60) Provisional application No. 62/555,144, filed on Sep. 7, 2017.

(51) Int. Cl.
| | | |
|---|---|---|
| *G01M 11/00* | (2006.01) | |
| *G02B 27/10* | (2006.01) | |
| *G01B 11/14* | (2006.01) | |
| *G02B 5/18* | (2006.01) | |
| *G01B 11/25* | (2006.01) | |
| *G02B 27/42* | (2006.01) | |

(52) U.S. Cl.
CPC ............ *G01M 11/00* (2013.01); *G01B 11/14* (2013.01); *G01B 11/2513* (2013.01); *G02B 5/1814* (2013.01); *G02B 27/106* (2013.01); *G02B 27/1093* (2013.01); *G02B 27/4266* (2013.01)

(58) Field of Classification Search
CPC .... G01M 11/00; G01B 11/14; G01B 11/2513; G02B 5/1814; G02B 27/106; G02B 27/1093; G02B 27/4266
See application file for complete search history.

(56) References Cited

U.S. PATENT DOCUMENTS

| | | | |
|---|---|---|---|
| 4,165,178 A | 8/1979 | Coumo, Jr. et al. | |
| 4,952,058 A * | 8/1990 | Noguchi | G01N 21/94 356/237.5 |

(Continued)

*Primary Examiner* — Roy M Punnoose
(74) *Attorney, Agent, or Firm* — McClure, Qualey & Rodack, LLP

(57) ABSTRACT

An optical test method is provided. The optical test method includes emitting light through a gap between two substrates of a tested optical element disposed on a holder to generate a plurality of light beams. The optical test method further includes driving the holder with the tested optical element to move to N positions. The optical test method also includes receiving one of the light beams from the tested optical element in the N positions to generate N first intensity signals. In addition, the optical test method includes determining the size of the gap of the tested optical element according to the N first intensity signals and reference data.

20 Claims, 8 Drawing Sheets

(56) References Cited

U.S. PATENT DOCUMENTS

| | | | | |
|---|---|---|---|---|
| 5,214,282 A | * | 5/1993 | Yamaguchi | G01Q 30/02 850/16 |
| 5,235,400 A | * | 8/1993 | Terasawa | G03F 7/70866 250/559.08 |
| 5,333,495 A | * | 8/1994 | Yamaguchi | H01J 37/28 73/105 |
| 5,781,299 A | | 7/1998 | Womack et al. | |
| 7,196,319 B2 | | 3/2007 | Saendig | |
| 8,730,574 B2 | * | 5/2014 | Araya | G02B 21/26 359/385 |
| 2007/0218372 A1 | | 9/2007 | Zalevsky et al. | |
| 2011/0134516 A1 | * | 6/2011 | Araya | G02B 21/26 359/371 |
| 2014/0333927 A1 | | 11/2014 | Shimbo et al. | |
| 2015/0369695 A1 | | 12/2015 | Sun et al. | |
| 2016/0377414 A1 | | 12/2016 | Thuries et al. | |
| 2017/0287151 A1 | | 10/2017 | Han et al. | |

\* cited by examiner

OPTICAL TEST SYSTEM AND METHOD FOR DETERMINING SIZE OF GAP BETWEEN TWO SUBSTRATES OF OPTICAL ELEMENT

CROSS REFERENCE TO RELATED APPLICATIONS

The present application is a Continuation of application Ser. No. 16/021,426 filed on Jun. 28, 2018, now U.S. Pat. No. 10,508,971, which claims priority of U.S. Provisional Patent Application No. 62/555,144, filed on Sep. 7, 2017, the entirety of which is incorporated by reference herein.

BACKGROUND

Three dimensional (3D) optical imaging systems are capable of providing distance measurements and a depth image of the objects within the capture area. Such systems are currently used in gaming and multimedia applications, for example, to provide human identification and gesture recognition, as well as in a wide variety of other applications, such as the inspection of semiconductors and other goods, computer-aided design (CAD) verification, robot vision, and geographic surveys. Generally, 3D optical imaging systems include an optical pattern projection system including a light source for illuminating objects. The 3D optical imaging system further includes a light receptor such as a 3D camera for receiving light reflected from an object and forming a 3D image of the object from the reflected light.

In some applications, a diffractive optical element is used in the optical pattern projection system for creating the desired projection pattern. The structure of the diffractive optical element is related to the optical characteristics of the diffractive optical element and the optical pattern projection system. Although existing test systems and methods for the inspection of the diffractive optical element have generally been adequate for their intended purposes, they have not been entirely satisfactory in all respects.

BRIEF DESCRIPTION OF THE DRAWINGS

For a more complete understanding of the present disclosure, and the advantages of the present disclosure, reference is now made to the following descriptions taken in conjunction with the accompanying drawings, in which.

DETAILED DESCRIPTION

Figure 1:
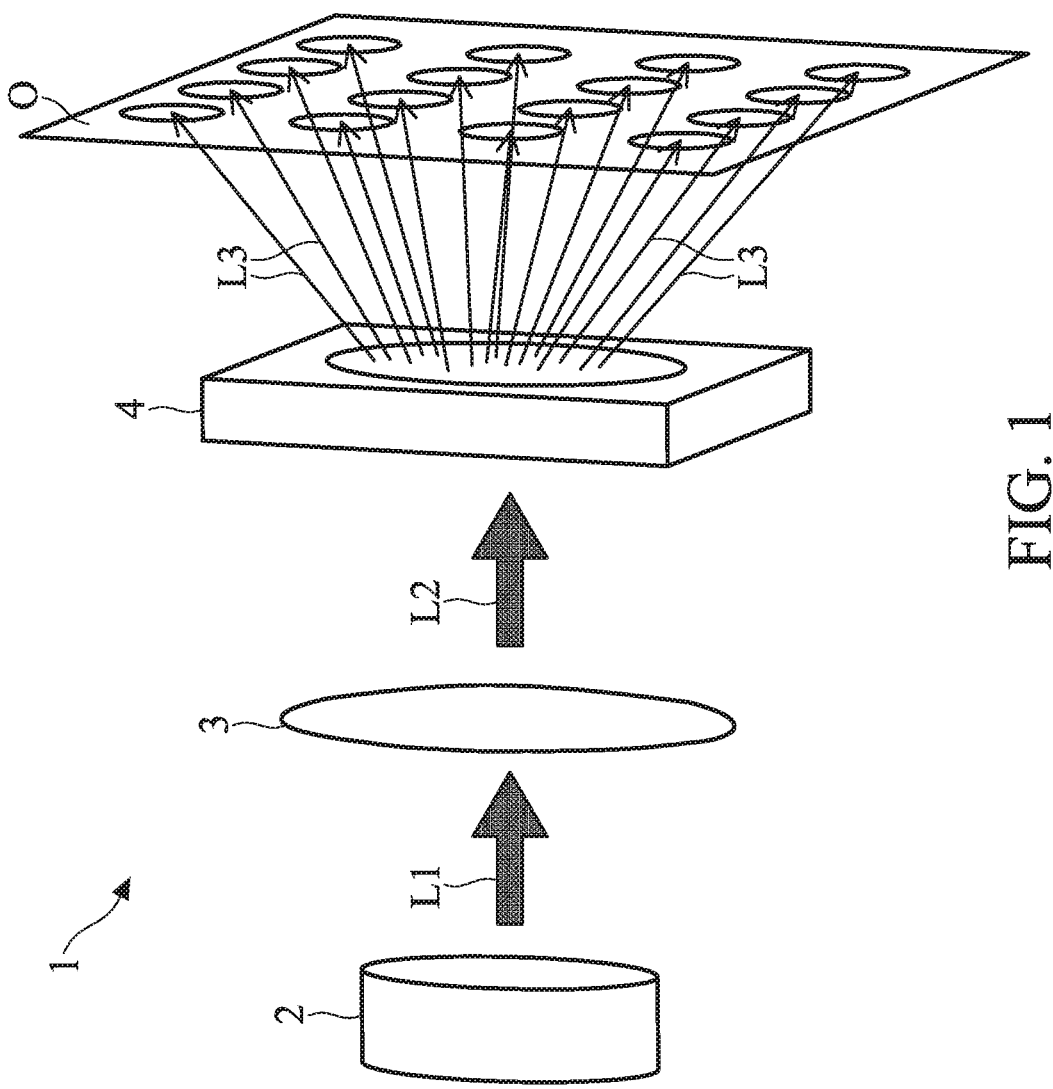
FIG. 1 is a schematic view of an optical pattern projection system, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Furthermore, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As described above, 3D optical imaging systems utilize an optical pattern projection system to create a projection pattern to illuminate an object or objects as desired. FIG. 1 is a schematic view of an optical pattern projection system 1 in accordance with some embodiments. As shown, the optical pattern projection system 1 includes a light source 2, a collimator lens 3, and a diffractive optical element 4.

The diffractive optical element 4 is disposed on one side of an object O (e.g., a screen). The light source 2 is a laser source for emitting a laser beam L1, such as a visible, infrared (IR), or other radiation which can be selected depending on different applications. The laser beam L1 is modulated by the collimator lens 3 and a parallel collimated beam L2 is output from the collimator lens 3. The diffractive optical element 4 includes specified diffractive grating structures (see FIG. 2) formed therein. When the collimated beam L2 passes through the diffractive optical element 4, the collimated beam L2 is diffracted by the diffractive grating structures.

Consequently, a number of diffracted light beams L3 with the desired optical pattern (e.g., a dot-array pattern, a striped pattern, etc.) are projected onto the object O positioned at a specified distance from the diffractive optical element 4. The optical pattern of the diffracted light beams L3 may be changed by providing or forming different diffractive grating structures in the diffractive optical element 4. In some other embodiments, the collimator lens 3 may also be omitted.

Figure 2:
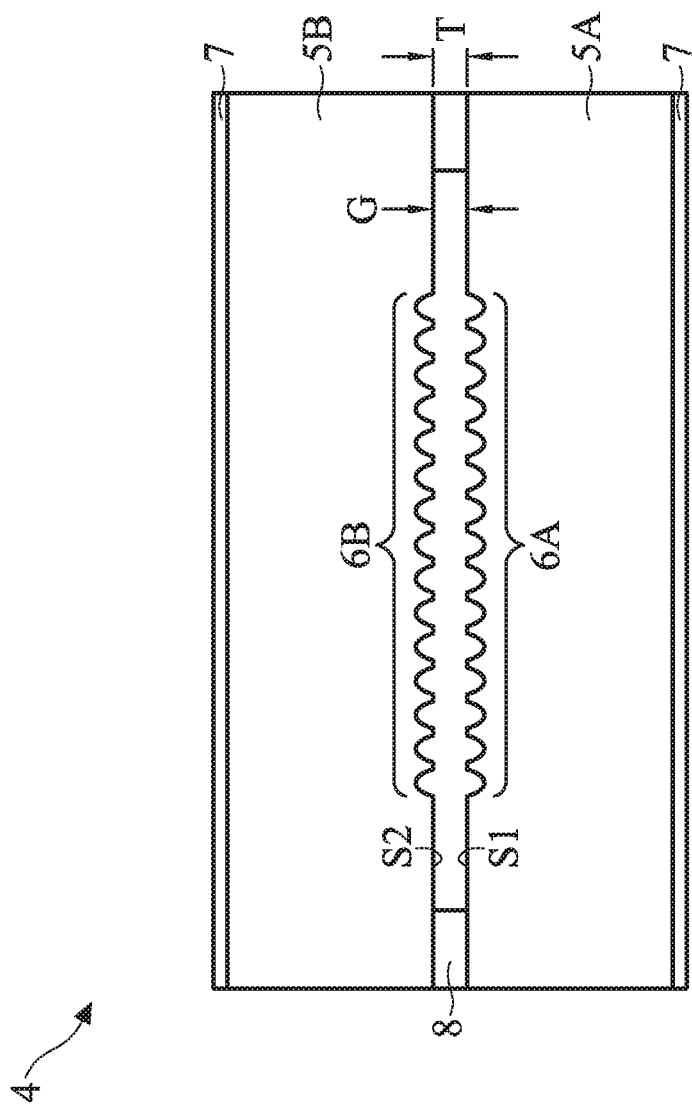
FIG. 2 is a cross-sectional view of the diffractive optical element in FIG. 1, in accordance with some embodiments.

FIG. 2 shows a cross-sectional view of the diffractive optical element 4 in FIG. 1 in accordance with some embodiments. As shown, the diffractive optical element 4 includes a first substrate 5A and a second substrate 5B parallel to and stacked on each other. In some embodiments, the first substrate 5A and the second substrate 5B are located on both sides of an adhesive layer 8. Each of the first and second substrates 5A and 5B may include a glass, polymer or another optional material that allows light (e.g., a visible, infrared, or other radiation) with a particular wavelength or in a wavelength range (used in the optical pattern projection system 1) to pass through.

In some embodiments, a first diffractive grating structure 6A and a second diffractive grating structure 6B are formed on the opposing surfaces S1 and S2 of the first and second substrates 5A and 5B, respectively. Each of the first and second diffractive grating structures 6A and 6B is designed according to the optical diffraction theory (i.e., a phase-type optical diffraction structure). The first and second diffractive grating structures 6A and 6B may be formed by a semiconductor processing technology (e.g., including photolithography, etching processes, etc.) or another optional technology.

In some other embodiments, the first and second diffractive grating structures 6A and 6B may be formed on the surfaces of two additional epoxy material layers (not shown), and the two epoxy material layers are disposed on or adhered to the first and second substrates 5A and 5B, respectively. The epoxy material layers allow light (e.g., a visible, infrared, or other radiation) with a particular wavelength or in a wavelength range to pass through.

In some embodiments, the configuration and arrangement of the first diffractive grating structure 6A may be the same as or different from the structure configuration and arrangement of the second diffractive grating structure 6B, depending on the desired optical pattern of the diffracted light beams L3 to be produced for various applications. The configuration (e.g., semicircle) of each structure unit in the first and second diffractive grating structures 6A and 6B and the arrangement (e.g., pitch) of the structure units are not limited to the embodiments shown in FIG. 2, and many variations and modifications can be made to embodiments of the disclosure. In some other embodiments, only one diffractive grating structure is formed on one of the opposing surfaces of the first and second substrates 5A and 5B.

In some embodiments, the outer surfaces of the first and second substrates 5A and 5B are respectively coated with an anti-reflection coating 7 to reduce the light reflection occurring thereon (i.e., to increase the light transmittance of the diffractive optical element 4). Although not shown, at least one non-transparent coating is further provided to cover a portion (e.g., the annular peripheral portion) of at least one of the opposing surfaces of the first and second substrates 5A and 5B to serve as an optical stop, thereby defining an optical aperture (i.e., a transparent window) of the diffractive optical element 4 that allows light to pass through.

In some embodiments, the adhesive layer 8 (e.g., an adhesive gel) is disposed between the annular peripheral portion of the opposing surfaces S1 and S2 of the first and second substrates 5A and 5B to bond the first and second substrates 5A and 5B together. As such, a (vertical) gap G (or bonding gap G) is formed between the opposing surfaces S1 and S2 of the first and second substrates 5A and 5B. The size of the gap G may vary with the thickness T of the adhesive layer 8 due to various applications and/or manufacturing tolerances.

Note that the size of the gap G may be accurately determined and the power of the light source 2 may be adjusted accordingly before using the optical pattern projection system 1 (FIG. 1), so that the generated diffracted light beams L3 can be projected onto the object O with the desired optical pattern of high quality (e.g., good resolution) and well-controlled intensity (this is also about safety considerations during use, such as, in the facial recognition application). For example, usually, the power of the light source 2 may be lowered in the case of a smaller size of the gap G in the diffractive optical element 4, or the power of the light source 2 may be increased in the case of a greater size of the gap G in the diffractive optical element 4, in order to maintain the intensity of the diffracted light beams L3 within an appropriate range. Consequently, it is needed to accurately obtain or determine the size of the gap G between the two substrates of the diffractive optical element 4 before use.

Figure 3:
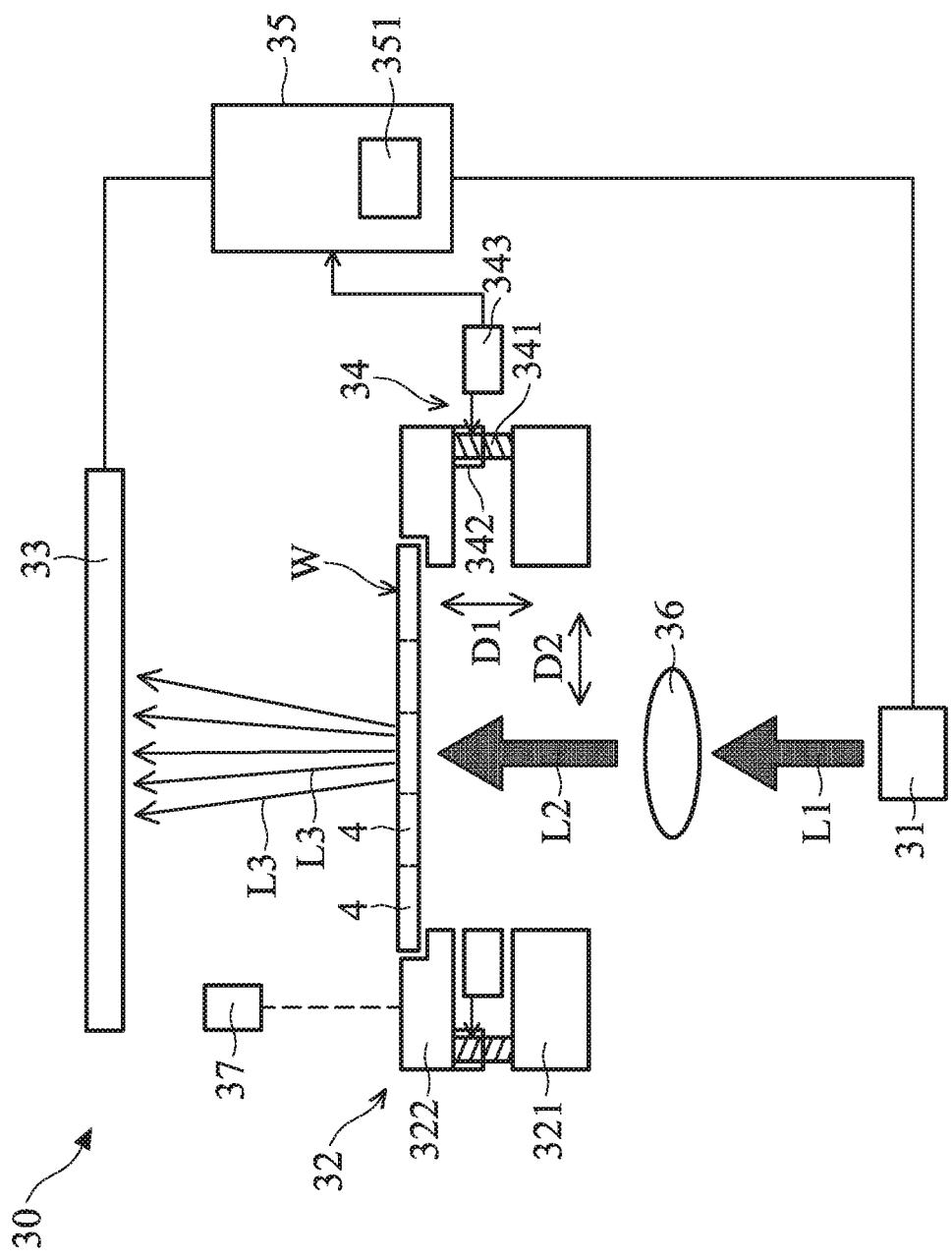
FIG. 3 is a schematic view of an optical test system for determining the size of a gap between two substrates of an optical element, in accordance with some embodiments.

FIG. 3 is a schematic view of an optical test system 30 for determining the size of a gap between two substrates of an optical element, in accordance with some embodiments. The optical test system 30 is configured to determine the size of a gap between two substrates of a diffractive optical element or other types of optical element (e.g., a refractive optical element) based on the operations of an optical test method 40 (FIG. 4) described below, in accordance with some embodiments. The following disclosure merely illustrates an example where the optical test system 30 (utilizing the optical test method 40) is used to determine the size of a gap G between two substrates (such as the first and second substrates 5A and 5B shown in FIG. 2) of a diffractive optical element (such as the diffractive optical element 4 shown in FIG. 2), for the purpose of simplicity and clarity.

As shown in FIG. 3, the optical test system 30 includes a light source 31, a holding stage 32, a sensor 33, a driving mechanism 34, and a controller 35. Additional features can be added into the optical test system 30, and some of the features described below can be replaced or eliminated in other embodiments of the optical test system 30.

The light source 31 is configured to emit light that will pass through an optical element during the test. In some embodiments, the light source 31 is a laser source configured to emit a laser beam L1 (e.g., a visible, IR, or other radiation). In some embodiments, the light source 31 is used to emit the laser beam L1 in a wavelength or wavelength range similar to (or the same as) that of the laser beam L1 (emitted by the light source 2) being used in the optical pattern projection system 1 for various applications. In some other embodiments, the light source 31 may be another type of light source (e.g., a light-emitting diode (LED)).

The operations (e.g., activation, stop, and power control etc.) of the light source 31 may be controlled by the controller 35 (e.g., a computer). In some embodiments, the controller 35 can be a computer device including a processing unit and a memory device 351. The processing unit can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein.

The laser beam L1 from the light source 31 is modulated by a collimator lens 36 (FIG. 3) and a parallel collimated beam L2 is output from the collimator lens 36 to pass through an optical element being tested. In some other embodiments, the collimator lens 36 may also be omitted.

The holding stage 32 is disposed between the collimator lens 36 (or the light source 31) and the sensor 33, configured to hold an optical element being tested. In some embodiments, the holding stage 32 is configured to hold a wafer W (FIG. 3) including a number of optical elements (i.e., the optical elements are in wafer form prior to being cut into several individual dies). In some embodiments, each optical element in the wafer W may be a diffractive optical element, such as the diffractive optical element 4 shown in FIG. 2. When the collimated beam L2 or the laser beam L1 passes through one of diffractive optical elements 4 in a specified location of the wafer W mounted on the holding stage 32, it is diffracted by the diffractive grating structures (such as the first and second diffractive grating structures 6A and 6B shown in FIG. 2) in the diffractive optical element 4 into a number of diffracted light beams L3.

In some embodiments, the holding stage 32 includes a base 321 and a holder 322, as shown in FIG. 3. The base 321 is stationary part in the optical test system 30. The holder 322 is a movable part movably disposed on the base 321 and configured to hold, for example, the wafer W (or the diffractive optical element 4) in some embodiments. During the test, the driving mechanism 34 is configured to drive the holder 322 with the wafer W (or the diffractive optical elements 4) to move relative to the base 321, for example, in a first direction D1 (FIG. 3) substantially parallel to the direction of light propagation (i.e., perpendicular to the light receiving surface (such as the lower surface shown in FIG. 3) of the sensor 33) in the optical test system 30.

In some embodiments, the driving mechanism 34 includes a number of screws 341, a number of nuts 342, and a number of (rotary) driving motors 343, as shown in FIG. 3. One nut 342 and one screw 341 may be correspondingly coupled together and form a lead screw that can convert a rotational movement of the screw 341 into a linear movement (along the first direction D1) of the nut 342. The driving motor 343 is configured to drive the screw 341 to rotate. In some embodiments, the (four) corners of the (square) base 321 of the holding stage 32 are respectively provided with a screw 341, a nut 342, and a driving motor 343. With these configurations, the driving mechanism 34 drives the holder 322 with the wafer W (or the diffractive optical element 4) to move relative to the base 321 in the first direction D1 during the test. In some other embodiments, the driving mechanism 34 may include single driving motor 343 to drive one screw 341 to rotate, so that the corresponding nut 342 and the holder 322 move along the screw 341.

The sensor 33 is configured to receive the light passing through the optical element during the test and generate an intensity (electric) signal in response to the intensity of the received light. In some embodiments, the sensor 33 is configured to selectively receive one of the diffracted light beams L3 (which will be further illustrated later) from the diffractive optical element 4, and capable of generating an intensity signal in response to the intensity of the received diffracted light beam L3. In some embodiments, the sensor 33 is a charge coupled device (CCD), a complementary metal-oxide semiconductor (CMOS) sensor or the like. The intensity signal generated by the sensor 33 is sent to the controller 35 for further processing (which will be illustrated later).

In some embodiments, the optical test system 30 further includes a distance meter 37 (e.g., a laser interferometer) configured to measure or determine the displacement or position of the holder 322 in the optical test system 30, as shown in FIG. 3. The distance meter 37 is also capable of generating a position signal in response to the position of the holder 322 and sending the position signal to the controller 35. The controller 35 controls the aforementioned operations of the driving mechanism 34 according to the position signal from the distance meter 37, and a computer program, related to the control of the displacement (which will be further illustrated later) of the holder 322 (i.e., the control of the operation of the driving mechanism 34) during the test, stored in a memory device 351 (e.g., a random access memory (RAM), a read-only memory (ROM) or the like) of the controller 35.

Figure 4:
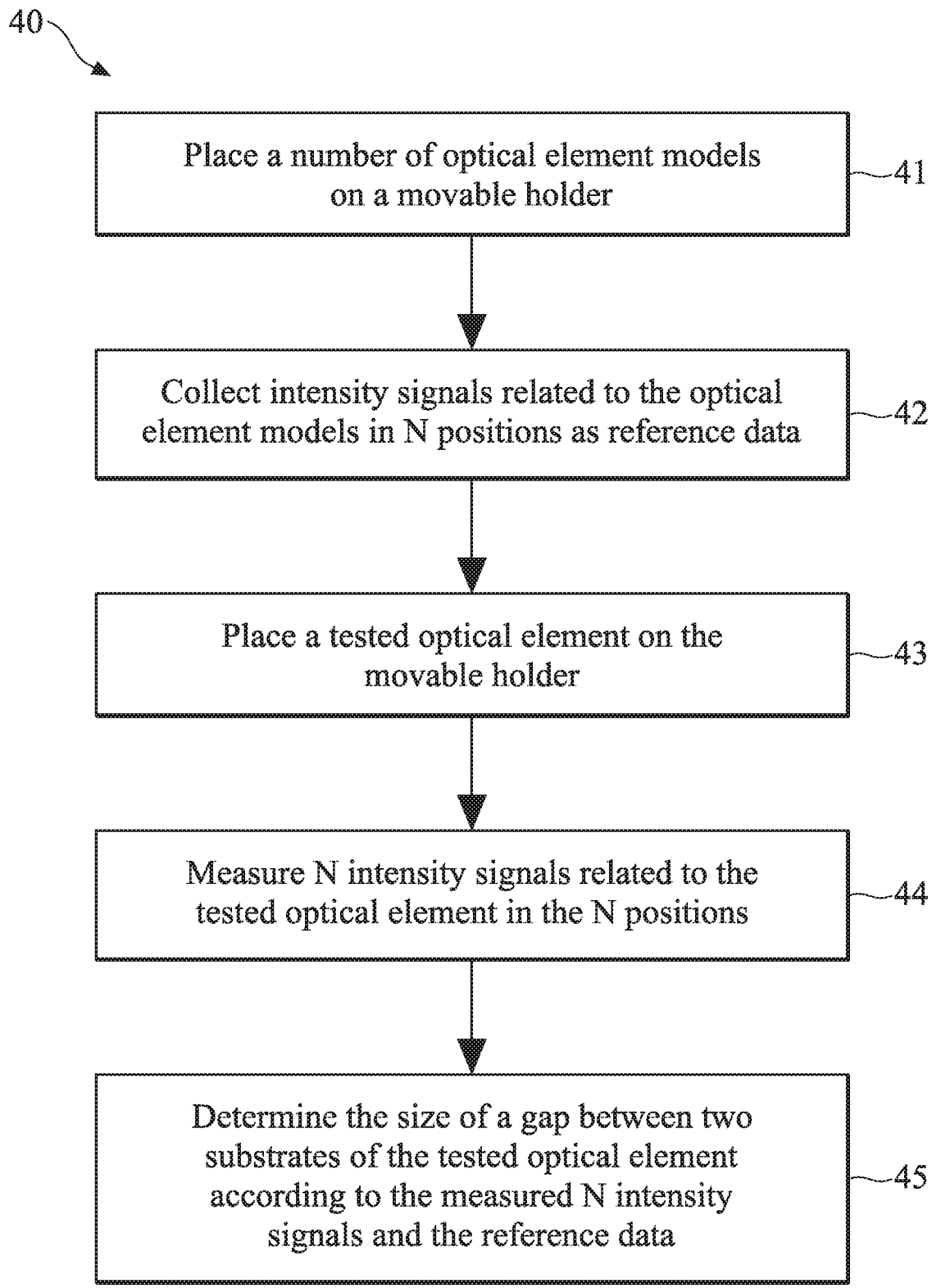
FIG. 4 is a simplified flowchart of an optical test method for determining the size of a gap between two substrates of an optical element, in accordance with some embodiments.

Next, referring to FIG. 4, which is a simplified flowchart of an optical test method 40 (implemented by the optical test system 30 shown in FIG. 3) for determining the size of a gap between two substrates of an optical element (for example and without limitation, a diffractive optical element 4 as shown in FIG. 2) before use, in accordance with some embodiments. For illustration, the flow chart will be described along with the drawings shown in FIGS. 2-3 and 5-8. Some of the described operations can be replaced or eliminated in different embodiments. Alternatively, some operations may be added in different embodiments. The optical test method 40 includes a number of operations, such as operations 41, 42, 43, 44, and 45.

In operation 41, before determining the size of the gap G (FIG. 2) in a diffractive optical element 4 (for illustration, hereinafter also referred to as a "tested optical element 4"), a number of optical element models M are placed on the movable holder 322 (FIG. 5) in the optical test system 30 to be tested as described below.

In some embodiments, each of the optical element models M is also a diffractive optical element (the same as the tested optical element 4) having a gap between two substrates thereof, and the sizes of the gaps of the optical element models M are different (i.e., the optical element models M have different bonding gap sizes). In some embodiments, the optical element models M have the same optical structure configuration as the tested optical element 4. For example, the optical element models M and the tested optical element 4 have the same configuration and arrangement of the first and second diffractive grating structures, as well as the same thickness of the first and second substrates and other material layers (except the adhesive layer) in a diffractive optical element as described above (FIG. 2). In some embodiments, the optical element models M are formed by the same fabrication processes as the tested optical element 4.

Next, in operation 42, the optical test system 30 is operated to collect multiple sets of intensity signals (for illustration, hereinafter also referred to as multiple sets of "sample intensity signals") that are corresponding to the optical element models M (with the different bonding gap sizes) as reference data for the tested optical element 4.

In some embodiments, the multiple sets of sample intensity signals corresponding to the optical element models M are measured and collected (which will be illustrated later) by the optical test system 30 while the optical element models M are in wafer form during the test. In some embodiments, the optical element models M (with the different bonding gap sizes) are in the same wafer W' or different wafers W' and being disposed on the holder 322 during the test (FIG. 5).

In some embodiments, in order to generate one set of sample intensity signals that is corresponding to one of the optical element models M (with a specified bonding gap size), the driving mechanism 34 (FIG. 3) drives the holder 322 with the wafer W' (or the optical element model M) to move (relative to the base 321 shown in FIG. 3) in the first direction D1 to multiple positions during the test. At the same time, the light source 31 emits light to pass though the optical element model M to generate a number of diffracted light beams L3, and the sensor 33 selectively receives one of the diffracted light beams L3 (e.g., the circled diffracted light beam L3 shown in FIG. 5)). The operation of the driving mechanism 34 may be controlled by the controller 35 (FIG. 3) in some embodiments.

Figure 5:
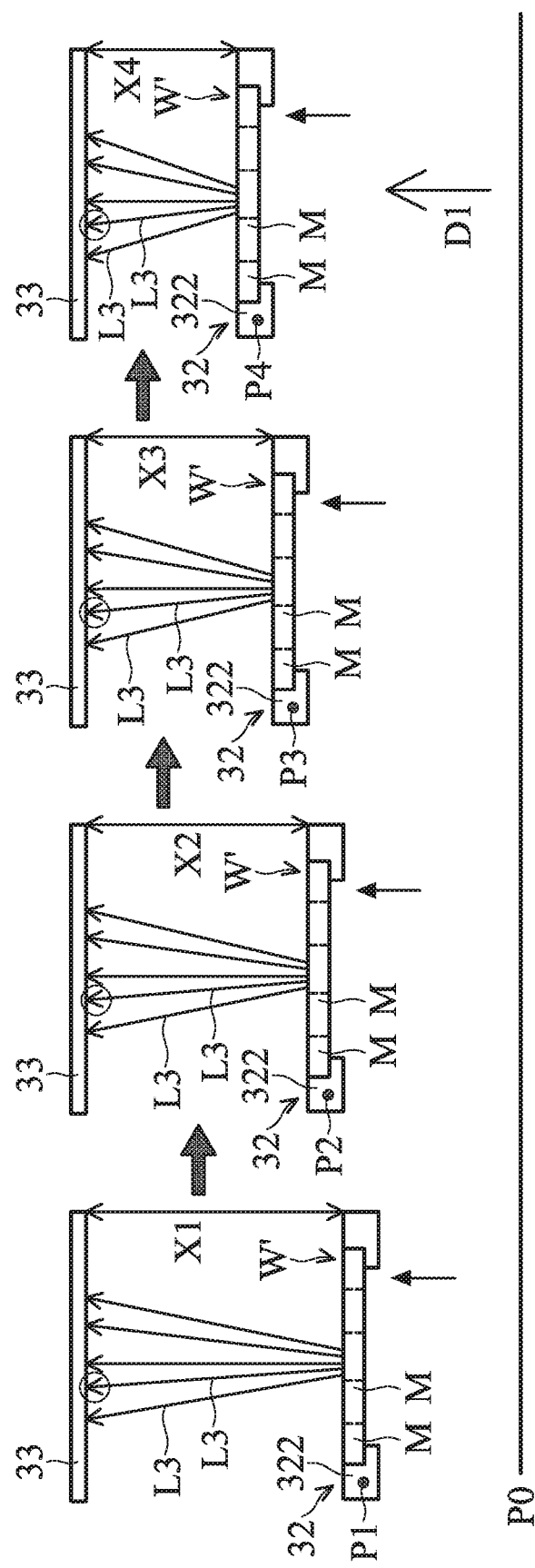
FIG. 5 is a schematic view illustrating that the holder (with one optical element model) is moved to multiple positions during the test, in accordance with some embodiments.

FIG. 5 is a schematic view illustrating that the holder 322 (with the optical element model M) is moved to multiple positions (e.g., four positions P1, P2, P3, and P4; where the distances of the holder 322 (or the optical element model M) to the sensor 33 are indicated by X1, X2, X3, and X4, respectively) during the test, in accordance with some embodiments. In some embodiments, the positions P1, P2, P3, and P4 of the holder 322 are apart from the original position P0 of the holder 322 (e.g., where the holder 322 is closest to the base 321) by 50 µm, 100 µm, 150 µm, and 200 µm, respectively. That is, the distances between two adjacent positions in the four positions P1, P2, P3, and P4 may be the same. In some alternative embodiments, the holder 322 with the wafer W' (or the optical element model M) may also be driven by the driving mechanism 34 to move in the first direction D1 to N positions during the test, wherein N is a natural number greater than or equal to 2 and the distances between two adjacent positions in the N positions are the same or different, in some other embodiments. It should be realized that the minimum distance between two adjacent positions of the holder 322 depends on the movement limit of the holder 322, and the maximum distance between two adjacent positions of the holder 322 is chosen so that the sensor 33 can successfully receive intensity signals from the optical element model M at all moving positions (i.e. the movement of the optical element model M does not exceed the focus range of the sensor 33).

Therefore, the distance between the optical element model M and the sensor 33 may vary along with the different positions of the holder 322, and also the intensity of the diffracted light beam L3 (received by the sensor 33) from the optical element model M may vary accordingly.

It should also be understood that the intensity of the diffracted light beam from a diffractive optical element (e.g., the optical element model M) is given by the sinc function of the distance of the positive or negative diffracted light beam to the 0-order diffracted light beam on the object (or the sensor 33) and the distance of the diffractive optical element to the object/the sensor 33 (i.e., the Huygens-Fresnel principle). As such, the intensity of the positive or negative diffracted light beam (e.g., +1-order, −1-order, or a higher order positive or negative diffracted light beam) from the optical element model M received by the sensor 33 may vary along with the different positions of the optical element model M (i.e., different distances of the optical element model M to the sensor 33). Conversely, the intensity of the 0-order diffracted light beam from the optical element model M received by the sensor 33 does not vary along with different positions of the optical element model M.

Accordingly, by receiving one of the positive and negative diffracted light beams, such as +1-order or −1-order diffracted light beam (e.g., the circled diffracted light beam L3 shown in FIG. 5) from the optical element model M in N positions, the sensor 433 generates N sample (second) intensity signals (i.e., one set of sample intensity signals) that are corresponding to the optical element model M in the N positions. In this case, N is greater than or equal to 3 to better and accurately express the optical element model M with a specified bonding gap size between two substrates thereof by the N sample (second) intensity signals.

In operation 42, multiple sets of sample (second) intensity signals (i.e., the reference data) corresponding to a number of optical element models M (with different bonding gap sizes) may also be generated by the sensor 33 and then sent to the controller 35, and the memory device 351 of the controller 35 stores the reference data, in some embodiments. Additionally, after collecting the multiple sets of sample intensity signals corresponding to the optical element models M, the wafer(s) W' (or the optical element models M) may be removed from the holder 322 to a microscope to measure the size of a gap between two substrates of each of the optical element models M. In some embodiments, the sizes of the gaps of the optical element models M may be determined by observing the cross-sections of the sliced optical element models M.

Figure 6:
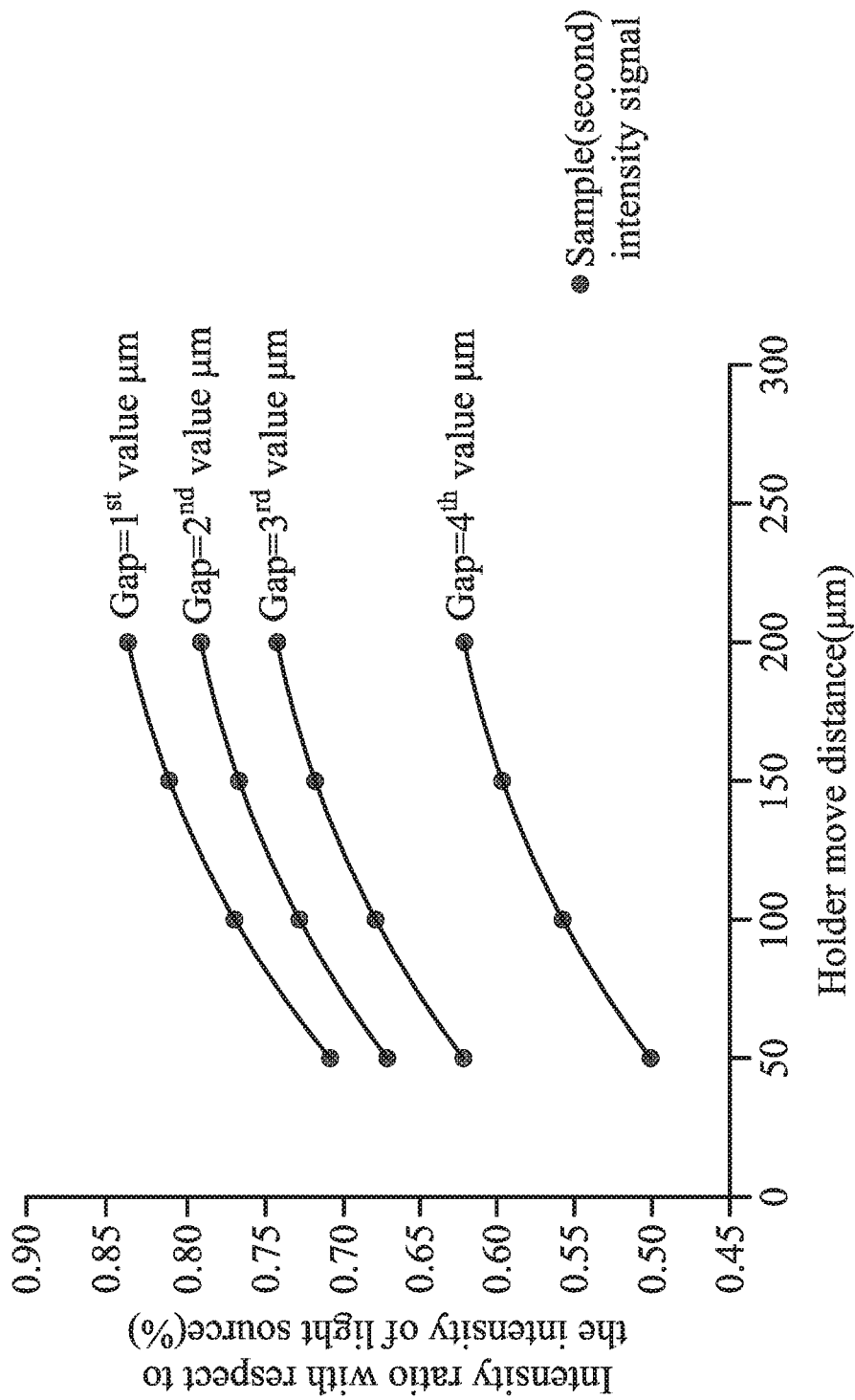
FIG. 6 is a diagram plotting multiple sets of sample (second) intensity signals that are corresponding to a number of optical element models (with different bonding gap sizes) in multiple positions, in accordance with some embodiments.

FIG. 6 is a diagram plotting multiple sets (e.g., four sets) of sample intensity signals (respectively including four sample (second) intensity signals) that are corresponding to a number of optical element models M (with the different bonding gap sizes) in multiple positions (e.g., four positions corresponding to the positions P1, P2, P3, and P4 as illustrated in the embodiments of FIG. 5), in accordance with some embodiments. As shown in FIG. 6, the intensity of multiple sets of sample (second) intensity signals corresponding to the optical element models M with different bonding gap sizes is different.

In some embodiments, the sample (second) intensity signals corresponding to one of the optical element models M in N different positions may further form a characteristic curve corresponding to the optical element model M if the number (N) of sample intensity signals is large enough, as shown in FIG. 6. In some embodiments, the sample (second) intensity signals corresponding to the optical element models M in the original position P0 (FIG. 5) may also be used as the reference data. In some embodiments, the total displacement amount of the holder 322 (with the optical element models M) relative to the base 321 may also be adjusted or changed.

In operation 43, after the reference data (such as the diagram shown in FIG. 6) for the tested optical element 4 is collected and the optical element models M are removed from the holder 322, the tested optical element 4 is placed on the holder 322 to be tested as described below.

Next, in operation 44, the optical test system 30 is operated to measure N (first) intensity signals corresponding to the tested optical element 4 in the N positions that are the same as the N positions where the sample (second) intensity signals corresponding to the optical element models M are measured and collected. In some alternative embodiments, the optical test system 30 is operated to measure N' (first) intensity signals corresponding to the tested optical element 4 in N' positions, while N' is a natural number greater than 2 and less than N, and the N' positions correspond to some of the N positions.

Figure 7:
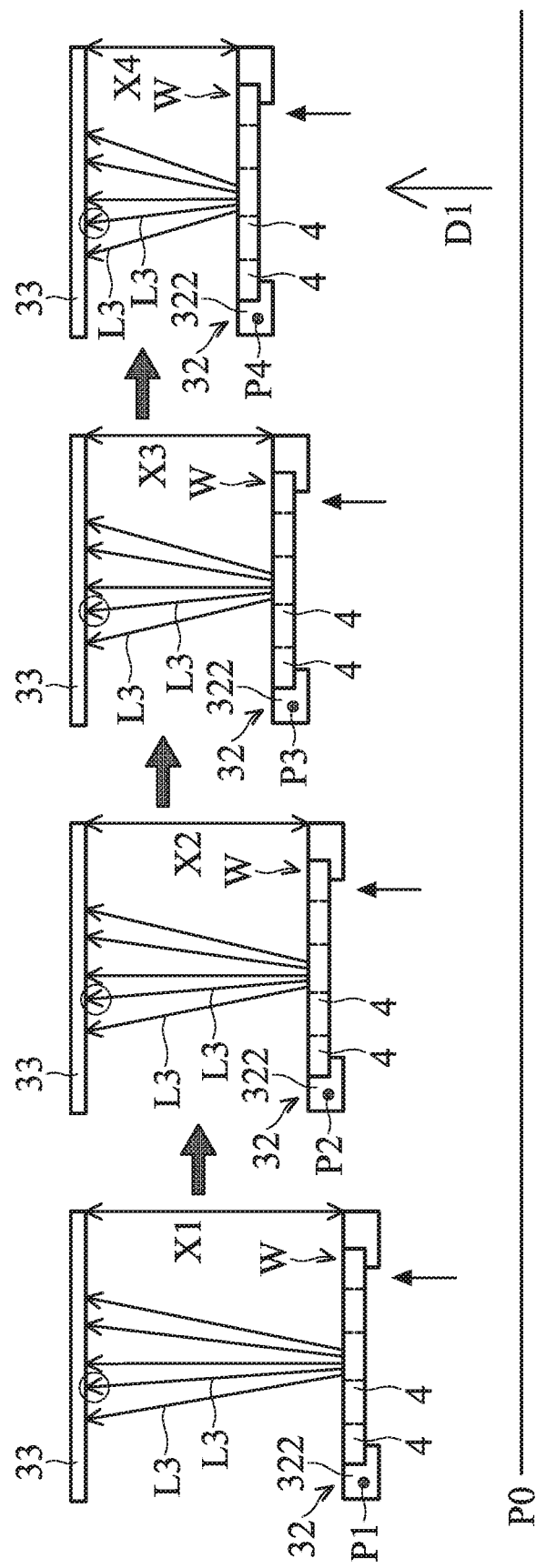
FIG. 7 is a schematic view illustrating that the holder (with a tested optical element) is moved to multiple positions during the test, in accordance with some embodiments.

In some embodiments, similar to the operation 42 for measuring the multiple sets of sample intensity signals corresponding to the optical element models M, the driving mechanism 34 (FIG. 3) drives the holder 322 with the tested optical element 4 to move (relative to the base 321 shown in FIG. 3) in the first direction D1 to N positions (e.g., four positions P1, P2, P3, and P4) during the test of the tested optical element 4, as shown in FIG. 7. At the same time, the light source 31 emits light to pass though the tested optical element 4 to generate a number of diffracted light beams L3, and the sensor 33 selectively receives one of the diffracted light beams L3 (e.g., the circled diffracted light beam L3 shown in FIG. 7)) from the tested optical element 4. In some embodiments, the received diffracted light beam L3 is a positive or negative diffracted light beam (e.g., +1-order or −1-order diffracted light beam), the same as the received diffracted light beam L3 for generating the sample (second) intensity signals in the operation 42. In addition, the four positions P1, P2, P3, and P4 may be the same as those for measuring and collecting the sample (second) intensity signals in the operation 42.

Figure 8:
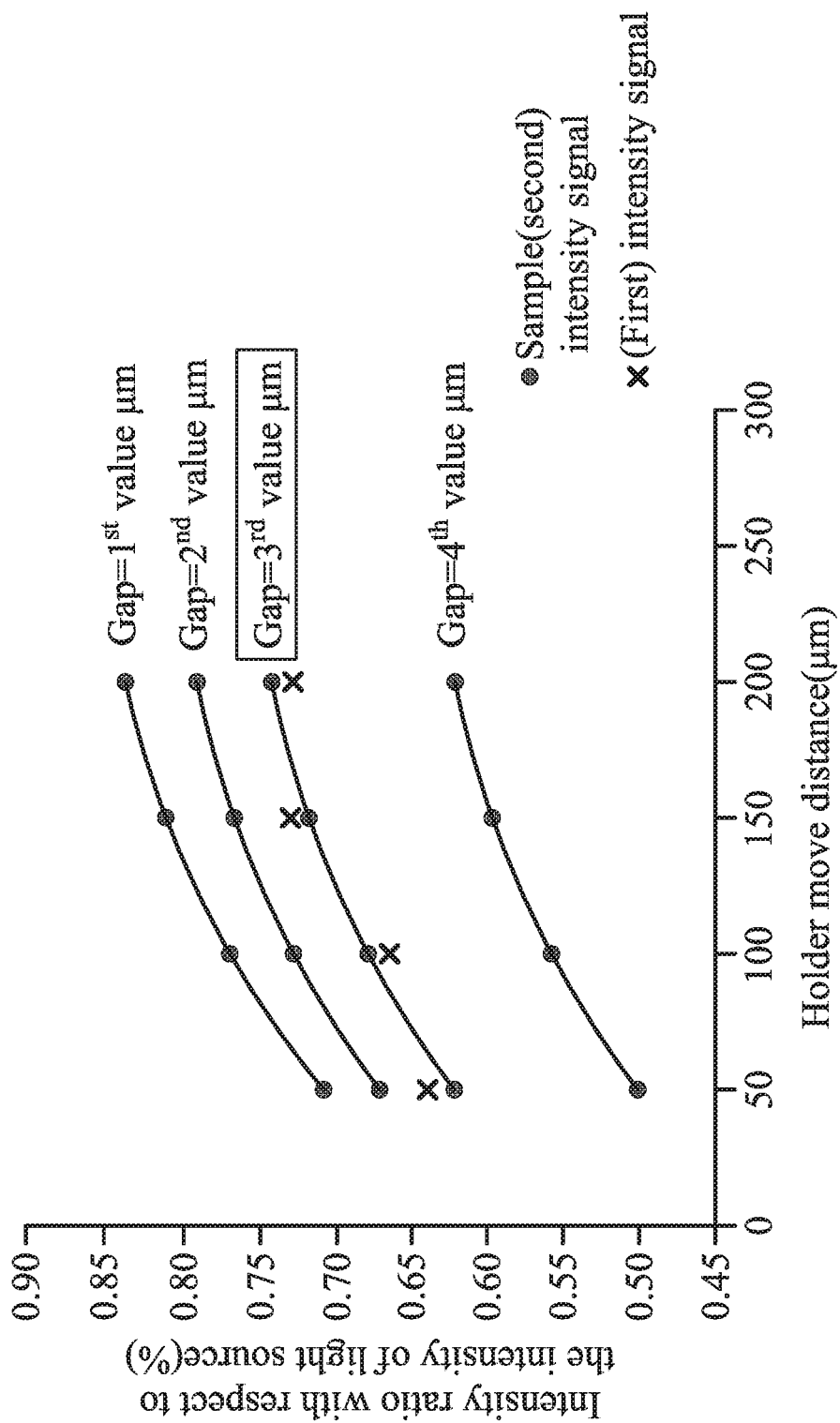
FIG. 8 is a schematic view showing that the size of a gap between two substrates of the tested optical element is determined according to the measured first intensity signals corresponding to the tested optical element and the reference data including multiple sets of sample (second) intensity signals that are corresponding to a number of optical element models, in accordance with some embodiments.

Accordingly, the sensor 33 generates N (first) intensity signals (e.g., four first intensity signals as the cross marks indicate in FIG. 8) corresponding to the tested optical element 4 in the N positions.

In operation 45, the size of a gap between two substrates of the tested optical element 4 is determined according to the measured N (first) intensity signals and the previously collected reference data (including multiple sets of sample (second) intensity signals corresponding to a number of optical element models M) stored in the memory device 351 of the controller 35.

In some embodiments, in order to determine the size of the gap between two substrates of the tested optical element 4, the controller 35 is used to calculate the intensity difference (absolute value) between the measured N (e.g., four) first intensity signals and the N (e.g., four) second intensity signals of each set of sample intensity signals corresponding to a number of optical element models M. Based on the calculation or comparison result, the controller 35 determines that the size of the gap between two substrates of the tested optical element 4 is the same as that of one of the optical element models M (such as the optical element model M with the gap size of $3^{rd}$ value μm as shown in FIG. 8) when the sum of the intensity difference between the N first intensity signals and the N second intensity signals corresponding to the optical element model M is the minimum (with respect to the other optical element models M). Consequently, the size of the gap between two substrates of the tested optical element 4 is determined.

In some embodiments, after the gap size of one of the tested optical element 4 in the wafer W is determined, the holder 322 may also be moved by a driving mechanism (not shown) in a second direction D2 (FIG. 3) perpendicular to the first direction D1 so that another tested optical element 4 in the wafer W is moved to the tested position where the light beam from the light source 31 will pass through. Afterwards, the above operations of the optical test method 40 are repeated for determining its gap size. In some embodiments, the sensor 33 of the optical test system 30 is also configured to measure the intensity of the diffracted light beams from a number of or all the tested optical elements 4 in the wafer W at one time.

The embodiments of the present disclosure have some advantageous features: The size of the gap between two substrates of an optical element (e.g., a diffractive optical element or another type of optical element) can be accurately determined by the optical test system using the optical test method as described above, without using an electrical test method which needs to provide electrical components (e.g., conductive layers and pads) in the optical element for the electrical test implemented by an electrical testing apparatus. Accordingly, the number of operations in the process of forming the optical element, as well as the cost of the electrical testing apparatus, may be reduced.

In some embodiments, an optical test method is provided. The optical test method includes emitting light through a gap between two substrates of a tested optical element disposed on the holder to generate a plurality of light beams. The optical test method further includes driving the holder with the tested optical element to move to N positions. The optical test method also includes receiving one of the light beams from the tested optical element in the N positions to generate N first intensity signals. In addition, the optical test method includes determining the size of the gap of the tested optical element according to the N first intensity signals and reference data.

In some embodiments, an optical test method is provided. The optical test method includes collecting multiple sets of sample intensity signals corresponding to a plurality of optical element models as reference data. The optical element models respectively have a gap between two substrates of each of the optical element models, and the sizes of the gaps of the optical element models are different. Each set of sample intensity signals comprises N second intensity signals corresponding to one of the optical element models in N positions. The optical test method further includes measuring N first intensity signals corresponding to a tested optical element in the N positions. In addition, the optical test method includes determining the size of a gap between two substrates of the tested optical element according to the N first intensity signals and the reference data.

In some embodiments, an optical test system is provided. The optical test system includes a holder, a light source, a driving mechanism, a sensor, and a controller. The holder is configured to hold an optical element. The light source is configured to emit light through the optical element to generate a plurality of light beams. The driving mechanism is configured to drive the holder with the optical element to move N positions. The sensor is configured to receive one of the light beams from the optical element in the N positions to generate N first intensity signals. The controller is configured to determine the size of a gap between two substrates of the optical element according to the N first intensity signals and reference data.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical test method, comprising:
emitting light through an optical element disposed on and moved in a first direction by a holder to generate a plurality of light beams corresponding to N positions of the optical element, the first direction being parallel to the direction of light propagation, wherein N is a natural number greater than 2;

receiving the plurality of light beams from the optical element by a sensor to generate N first intensity signals; and determining a structure configuration of the optical element according to the N first intensity signals and reference data with a controller.

2. The optical test method as claimed in claim 1, wherein the controller includes a memory device storing the reference data comprising multiple sets of sample intensity signals which correspond to a plurality of optical element models, wherein the plurality of optical element models each have similar or the same structure configuration as the optical element, and each set of sample intensity signals comprises N second intensity signals corresponding to one of the optical element models in the N positions.

3. The optical test method as claimed in claim 2, wherein before the operation of emitting light through the optical element and the operation of receiving the plurality of light beams from the optical element by the sensor, the optical test method further comprises collecting the reference data by the sensor.

4. The optical test method as claimed in claim 2, wherein the operation of determining the structure configuration of the optical element further comprises:

calculating intensity differences between the N first intensity signals and the N second intensity signals of each set of sample intensity signals; and determining that the structure configuration of the optical element is the same as that of one of the optical element models when a sum of the intensity differences between the N first intensity signals and the N second intensity signals corresponding to the one of the optical element models is the minimum.

5. The optical test method as claimed in claim 1, wherein N is greater than or equal to 3.

6. The optical test method as claimed in claim 1, wherein the holder with the optical element is driven to move by at least one driving motor.

7. The optical test method as claimed in claim 1, wherein the optical element is a diffractive optical element.

8. The optical test method as claimed in claim 7, wherein the received light beam for generating the first intensity signal is a positive or negative diffracted light beam from the diffractive optical element.

9. The optical test method as claimed in claim 7, wherein the diffractive optical element comprises a first substrate and a second substrate stacked on each other, at least one diffractive grating structure is formed on at least one of opposing surfaces of the first and second substrates, and a gap is formed between the opposing surfaces of the first and second substrates, wherein the structure configuration of the optical element to be determined is the gap.

10. The optical test method as claimed in claim 1, wherein the holder is movable between the N positions in the first direction that is perpendicular to a light receiving surface of the sensor.

11. An optical test system, comprising:

a holder configured to hold and move an optical element in a first direction to N positions, wherein N is a natural number greater than 2;

a light source configured to emit light through the optical element to generate a light beam, wherein the direction of light propagation is parallel to the first direction;

a sensor configured to receive a plurality of light beams from the optical element in the N positions to generate N first intensity signals; and a controller configured to determine a structure configuration of the optical element according to the N first intensity signals and reference data.

12. The optical test system as claimed in claim 11, wherein the reference data comprises multiple sets of sample intensity signals corresponding to a plurality of optical element models, wherein the plurality of optical element models each have similar or the same structure configuration as the optical element, and each set of sample intensity signals comprises N second intensity signals corresponding to one of the optical element models in the N positions.

13. The optical test system as claimed in claim 11, wherein the controller further comprises a memory device configured to store the reference data.

14. The optical test system as claimed in claim 11, further comprising a driving mechanism configured to drive the holder with the optical element to the N position, and the driving mechanism comprises at least one driving motor.

15. The optical test system as claimed in claim 14, further comprising a holding stage comprising the holder and a base, wherein the holder is movably disposed on the base, and the driving mechanism is configured to drive the holder to move relative to the base in the first direction perpendicular to a light receiving surface of the sensor.

16. The optical test system as claimed in claim 11, wherein the light emitted from the light source is infrared light.

17. The optical test system as claimed in claim 11, wherein the optical element is a diffractive optical element.

18. The optical test system as claimed in claim 17, wherein the light beam received by the sensor for generating the first intensity signal is a positive or negative diffracted light beam from the diffractive optical element.

19. The optical test system as claimed in claim 11, wherein distances between two adjacent positions of the N positions are the same.

20. An optical test system, comprising:

a holder configured to hold and move one of an optical element and a plurality of optical element models in a first direction to N positions, wherein N is a natural number greater than 2, and the plurality of optical element models each have similar or the same structure configuration as the optical element;

a sensor configured to receive a plurality of light beams from the optical element in the N positions to generate N first intensity signals, and configured to receive a plurality of light beams from one of the plurality of optical element models in the N positions to generate N second intensity signals, wherein the first direction is perpendicular to a light receiving surface of the sensor; and a controller configured to determine a structure configuration of the optical element according to the N first intensity signals and the N second intensity signals corresponding to one of the optical element models.

* * * * *